US009041669B1

(12) United States Patent
Garg

(10) Patent No.: US 9,041,669 B1
(45) Date of Patent: May 26, 2015

(54) INPUT/OUTPUT DEVICE

(75) Inventor: Parag K. Garg, Woodinville, WA (US)

(73) Assignee: Amazon Technologies, Inc., Reno, NV (US)

(*) Notice: Subject to any disclaimer, the term of this patent is extended or adjusted under 35 U.S.C. 154(b) by 127 days.

(21) Appl. No.: 13/528,233

(22) Filed: Jun. 20, 2012

(51) Int. Cl.
    G06F 3/041     (2006.01)
    G06F 3/0346    (2013.01)

(52) U.S. Cl.
    CPC ..................................... G06F 3/041 (2013.01)

(58) Field of Classification Search
    USPC .............. 345/173–179, 97, 104, 107, 1.1–1.2
    See application file for complete search history.

(56) References Cited

U.S. PATENT DOCUMENTS

| 2002/0118175 | A1* | 8/2002  | Liebenow et al. | 345/168 |
| 2005/0275967 | A1* | 12/2005 | Olien et al.    | 360/119 |
| 2006/0119541 | A1* | 6/2006  | Blythe et al.   | 345/31  |
| 2007/0027960 | A1* | 2/2007  | De Leon         | 709/217 |
| 2008/0192013 | A1* | 8/2008  | Barrus et al.   | 345/173 |
| 2011/0260976 | A1* | 10/2011 | Larsen et al.   | 345/168 |
| 2013/0012312 | A1* | 1/2013  | Mineur et al.   | 463/31  |

FOREIGN PATENT DOCUMENTS

WO          11 00012       * 9/2011

OTHER PUBLICATIONS

Rosenberg, Liya and Ken Perlin, The UnMousePAd—an Interpolating Multi-touch Force-sensing Input pad, Aug. 2009, AMC Transactions on Graphics, vol. 28, No. 3, Article 65, p. 65:1-65:9.*

* cited by examiner

*Primary Examiner* — Kenneth Bukowski
(74) *Attorney, Agent, or Firm* — Sutherland Asbill & Brennan LLP

(57) ABSTRACT

Interactive applications such as board games, puzzles, and so forth may utilize an input/output ("I/O") device described herein. The physical I/O device may be configured to accept input via one or more sensors including touch and proximity sensors. In some implementations the surface of the I/O device may present data of the interactive application. Physical input tokens may be used in conjunction with the I/O device to receive input from a user.

20 Claims, 11 Drawing Sheets

INPUT/OUTPUT DEVICE

BACKGROUND

A variety of user devices, such as electronic book ("e-Book") reader devices, desktop computers, portable computers, smartphones, tablet computers, and so forth are used to access various forms of content and applications. Humans naturally wish to physically manipulate things. However, until now user devices traditionally minimized physicality of interaction with users, both in terms of input and output.

Figure 1:
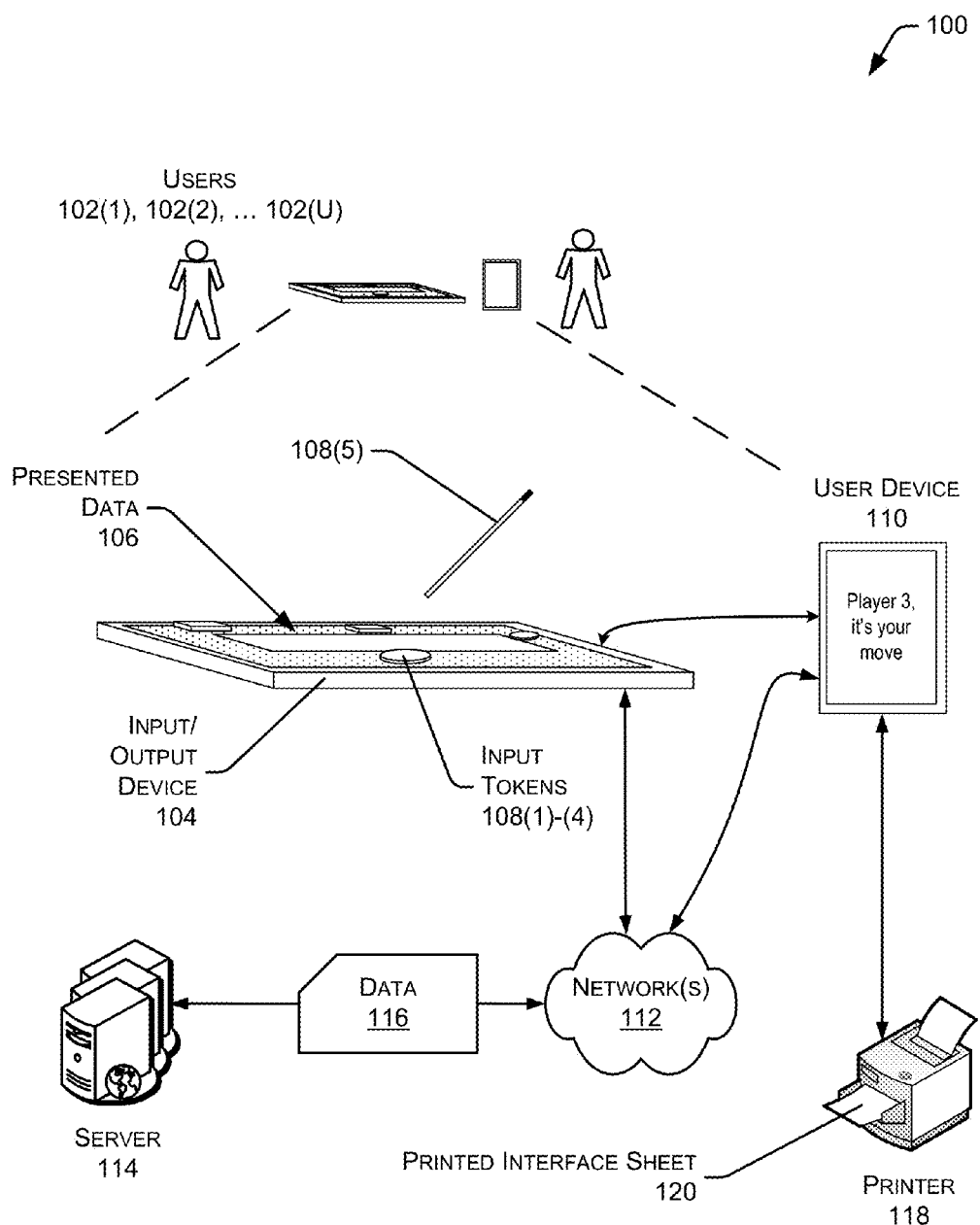
FIG. 1 illustrates a system comprising a user device coupled to an input/output device in accordance with an embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A variety of user devices, such as electronic book ("e-Book") reader devices, desktop computers, portable computers, smartphones, tablet computers, and so forth are used to access various forms of content and applications. Humans naturally wish to physically manipulate things. However, these user devices have traditionally minimized physicality of interaction with users, both in terms of input and output.

Described herein are devices, systems, and methods for using an input/output ("I/O") device in conjunction with another device such as a user device, server, or combination thereof to provide physicality to user interactions. In one implementation, the I/O device is configured to exchange data associated with one or more interactive applications executing at least in part on another device. An interactive application is a set of instructions configured to execute on a processor and direct the processor to receive input at least in part from the I/O device and provide output at least in part via the I/O device. The interaction application may include, but is not limited to, puzzles, games, architectural layout tools, logistics management tools, and so forth. The interaction provided or facilitated by the interactive application may be between one or more users. For example, the I/O device may present a jigsaw puzzle for use by a single user, or present a representation of a board layout for a game in which the users play with one another. In some implementations, the interaction application may provide an interaction interface, such as the board layout for the board game which is static for the duration of the game. In other implementations, the board layout may be more dynamic, such as changing in response to the moves of the users or their associated input tokens or playing pieces.

The input/output ("I/O") device may be designed such that it is relatively low cost. In one implementation, the I/O device may comprise a display and a touch sensor. This display may be configured for relatively low refresh rates or update rates, such as 10 times per second or slower. The display may also be monochrome. In some implementations the I/O device may use an electrophoretic display or other display which is configurable to display an image without application of a refresh or update signal.

The display may also be coupled to a touch sensor such as an interpolating force sensing resistor array ("IFSR"). The display and touch sensor may be configured such that an image may be presented and touch input received. Input tokens such as game pieces, small models, and so forth, may be used in conjunction with the I/O device to enhance the tactile experience.

Illustrative System

FIG. 1 illustrates a system 100 which may be used for providing input and output to one or more users 102(1), 102(2), 102(3), . . . 102(U). As used herein, letters enclosed by parenthesis such as "(U)" indicate an integer having a value greater than zero. One or more users 102 may interact with an interactive application or one another using an input/output device 104. The input/output ("I/O") device 104 may be configured to display presented data 106 on a display on at least a portion of the surface. The I/O device 104 may include a touch sensor coincident or otherwise coupled with the display. For example, the touch sensor may be disposed underneath or atop the display. Touches on the touch sensor may be imposed by the user 102, by input tokens 108(1)-108(4), or other objects. The I/O device 104 is described below in more detail with regard to FIG. 2.

The presented data 106 may comprise a representation of a game layout for a board game, pieces of a jigsaw puzzle, user prompts, and so forth. The I/O device 104 may couple to one or more user devices 110. The user device 110 may include e-Book reader devices, desktop computers, portable computers, tablet computers, game devices, media players, televisions, and so forth. In some implementations where the I/O device 104 has constrained capabilities resulting from cost considerations, the user device 110 may provide the primary processing capabilities for executing at least a portion of an interactive application. For example, the user device 110 may provide image data for an image associated with a game layout to the I/O device 104 for presentation. The I/O device 104 may then present the image and the users 102 may begin to play the board game. The user device 110 is described in more detail below with regard to FIG. 3.

The I/O device 104, the user device 110, or both may be configured to couple to one or more networks 112. The network 112 may include, but is not limited to, the Internet, a private network, a virtual private network, a wireless wide area network, a cellular data network, a personal area network, a local area network, a metropolitan area network, a telephone network, and so forth. The network 112 may also be coupled to one or more servers 114 or other devices. The network 112 provides for communication between the devices described herein. For example, the I/O device 104 may exchange information with other I/O devices 104 or with the server 114 via the network 112. This information exchanged may include data 116 including, but not limited to, interactive application modules, image data, input or other sensor data from the I/O device 104, and so forth.

In some implementations, the I/O device 104 may be used in conjunction with other materials. For example, where the I/O device 104 does not comprise a display, or where the display is unavailable or unable to present a particular image, such as where the display is monochrome and configured to present black and white images and a color game board is called for, a printer 118 may be used to generate a printed interface sheet 120 which may be placed on at least a portion of a surface of the I/O device 104. For example, a pre-printed board game sheet may be placed atop the I/O device 104 to support game play by the users 102. In some implementations, the display in the I/O device 104 and the printed interface sheet 120 may be used in conjunction with one another. For example, the printed interface sheet 120 may comprise a transparent or translucent material onto which images are printed.

While the I/O device 104 is depicted herein as operating in a horizontal orientation such that a largest plane of the device is orthogonal to gravity, in some implementations the I/O device 104 may be operated in other orientations. For example, in one implementation, the I/O device 104 may be oriented vertically, such as where the I/O device is hanging from a hook upon a vertical wall.

The overall shape of the I/O device 104 is depicted as a solid cuboid shape; other shapes both solid or nonsolid, regular or irregular, may be used. For example, the I/O device 104 may be configured in the form of a sphere, a cone, a tetrahedron, and so forth. Or the I/O device 104 may be configured in the shape of a hollow cylinder. The I/O device 104 may be configured to fold or bend to assume different shapes while in operation or when not in use.

While the presented data 106 is depicted on one surface of the I/O device 104 in this disclosure, in some implementations the display, touch sensor, and so forth may extend to two or more sides. For example, the I/O device 104 may be configured as a cube with displays and touch sensors on five or six sides, allowing interaction from several different directions.

Figure 2:
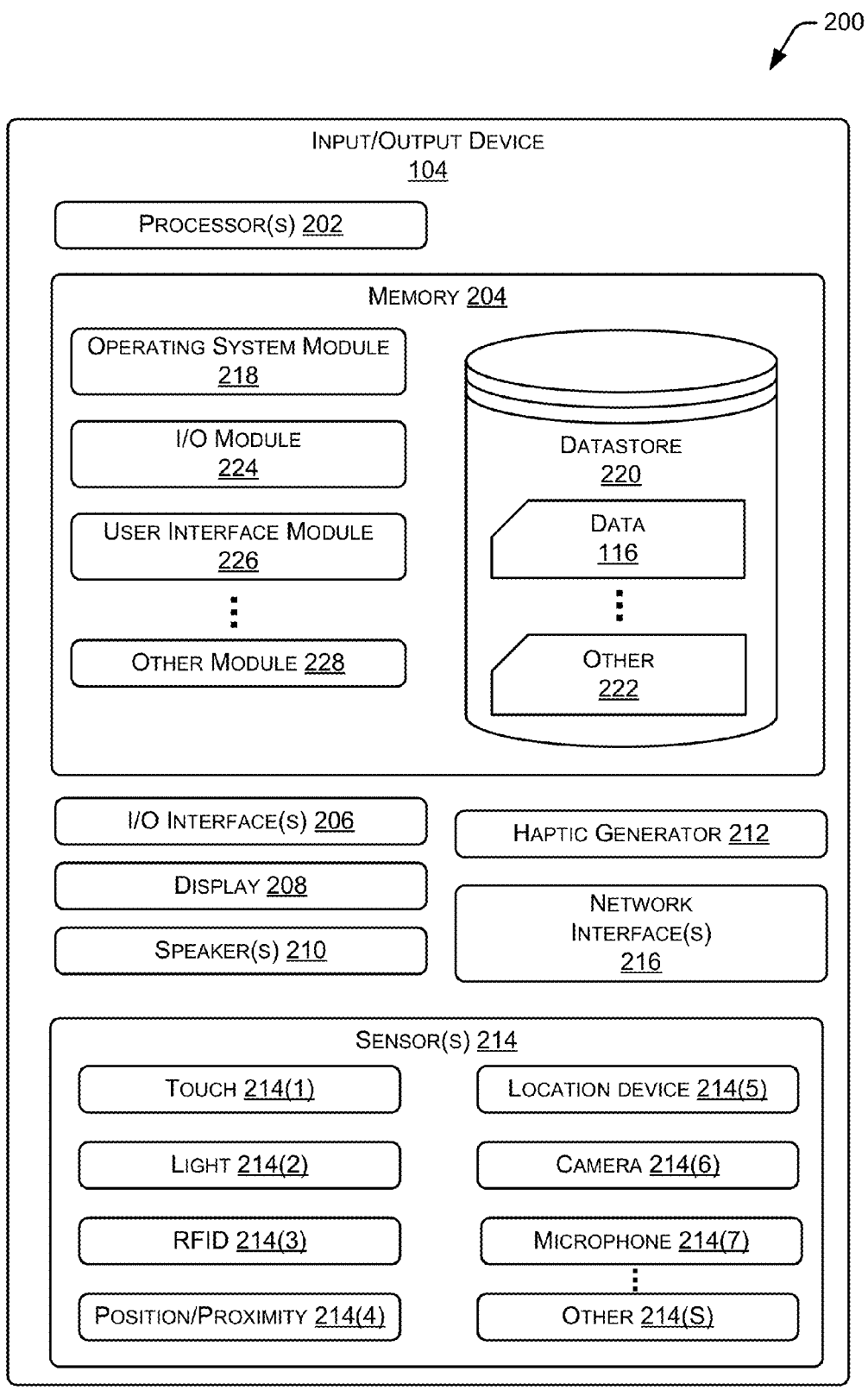
FIG. 2 illustrates a block diagram of the input/output device in accordance with an embodiment of the disclosure.

FIG. 2 illustrates a block diagram 200 of the I/O device 104. The I/O device 104 may be provided in a variety of configurations using one or more of the components described below. The configurations may be varied to meet requirements for functionality, cost, and so forth. In some implementations, these configurations may be modular, for example, allowing later addition of output devices, sensors, and so forth.

The I/O device 104 may comprise one or more processors 202, one or more memories 204, one or more input/output ("I/O") interfaces 206, one or more displays 208, one or more speakers 210, one or more haptic generators 212, one or more sensors 214, and one or more network interfaces 216. The I/O device 104 may include other devices not depicted.

The processor 202 may comprise one or more cores and is configured to access and execute, at least in part, instructions stored in the one or more memories 204. The one or more memories 204 comprise one or more computer-readable storage media ("CRSM"). The one or more memories 204 may include, but are not limited to, random access memory ("RAM"), flash RAM, magnetic media, optical media, and so forth. The one or more memories 204 may be volatile in that information is retained while providing power or non-volatile in that information is retained without providing power.

The I/O interfaces 206 allow for coupling devices or components such as the processor 202, the display 208, the speakers 210, the haptic generator 212, keyboards, joysticks, cameras, microphones, external memories, and so forth. In one implementation, the I/O interfaces 206 may comprise a near-field communication ("NFC") module. The NFC module may be used to provide for communication with the input tokens 108 or other devices.

The display 208 is configured to present visual information to the user 102. The display 208 may comprise a reflective or emissive display configured to present images to the user 102. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The reflective displays may be configured to display an image without application of a refresh or update signal. For example, a bistable electrophoretic display may be configured to retain an image generated by application of an update signal comprising a waveform even when power is no longer applied. The display 208 may be configured to present images in monochrome, color, or both. In some implementations, the display 208 of the I/O device 104 may use emissive, reflective, or combination displays with emissive and reflective elements.

The speakers 210 are configured to generate sound. This sound may be audible or inaudible, such as ultrasound. For example, background music appropriate for game play may be presented via the one or more speakers 210. The speakers 210 may comprise one or more electromagnetic, piezoelectric, electrostatic, or other elements to generate the sound.

The haptic generator 212 comprises one or more devices configured to produce a physical sensation or the appearance of a physical sensation to the user 102. The haptic generator 212 may comprise one or more actuators such as one or more piezoelectric actuators, high voltage sources, and so forth. For example, the haptic generator 212 may be configured to provide an apparent or actual change in surface texture of the I/O device 104 as the user 102 moves the input token 108 along the surface of the I/O device 104.

The I/O device 104 may include one or more sensors 214. These sensors may include touch sensors 214(1), light sensors 214(2), radio frequency identification ("RFID") readers 214(3), position/proximity sensors 214(4), location sensing devices 214(5), cameras 214(6), microphones 214(7), and other sensors 214(S). The other sensors 214(S) may include accelerometers, magnetic field sensors, strain sensors for detecting mechanical strain, and so forth. In some implementations, input may be received primarily via the touch sensors 214(1), while additional input may be received from supplemental sensors 214(2)-(S).

The touch sensor 214(1) may comprise devices configured to determine the presence of an applied force or other contact with an object such as a part of a human, a stylus, an input token 108, and so forth. The touch sensors 214(1) may comprise an IFSR array, capacitive touch sensor, optical touch sensor, ultrasonic touch sensor, electrostatic touch sensor, and so forth. The touch sensor 214(1) may be configured to determine a position on a touch sensor 214(1) surface. In some implementations, a magnitude of an applied force may also be determined. For example, that the particular input token 108 is exerting a force of 20 grams while resting on the touch sensor 214(1). In some implementations, this determination of the applied force may be inferred from another characteristic, such as the deformation of an object in contact with the touch sensor 214(1). For example, as a fingertip is pressed against a capacitive touch sensor, the surface area of the fingertip increases. Based at least in part on this increase in surface area, a magnitude of applied force may be inferred.

The light sensor 214(2) is configured to determine one or more of ambient light level, color of ambient light, direction of a source of ambient light relative to the I/O device 104, and so forth. Output from the light sensor 214(2) may be used to modify how the presented data 106 is presented on the display 208. For example, in low light conditions, portions of the presented data 106 such as icons or fonts may be enlarged.

The RFID reader 214(3) may be configured to acquire data from one or more RFID tags. The RFID tags may be embedded within or coupled to items such as the input tokens 108. By scanning for RFID tags, the RFID sensor 214(3) may generate data which may be used to determine what input tokens 108 or other items are proximate to the I/O device 104. In some implementations, this functionality may be provided by the NFC module described above.

The position/proximity sensor 214(4) is configured to determine the position of an object in space, proximity, or both relative to the I/O device 104 or a portion thereof. The object may be the input token 108, the user 102, and so forth. The position/proximity sensor 214(4) may comprise devices such as an infrared proximity sensor, a structured light system, an optical time-of-flight, an ultrasonic rangefinder, and so forth. For example, the position/proximity sensor 214(4) may thus be used to determine a distance and direction of the user's 102 hand moving over the I/O device 104.

The location device 214(5) such as global positioning system or other navigation or positional devices may provide information such as a location of the I/O device 104. This location information may be geographic location (or "geolocation") data such as a particular set of coordinates on the surface of the Earth, or may be a relative location such as "in the kitchen" or "in the living room."

The camera 214(6) may be used to acquire images. These images may be used for entertainment, archival, detection, or other purposes. For example, the camera 214(6) of the I/O device 104 may be used to generate pictures from a party where the users 102 are playing games using the I/O device 104. Or the camera 214(6) may support videoconferencing, such as when the users 102 are physically separated from one another but are playing a common game. The one or more cameras 214(6) may be used for machine vision purposes, such as to provide position/proximity data, to acquire image data of the users 102 to recognize the users 102, and so forth.

The microphone 214(7) may be configured to acquire sound information. For example, the microphone 214(7) may be used to acquire sound of the user 102 uttering commands for changing operation of the interactive application. In some implementations, sound information from a plurality of microphones 214(7) may be used to localize a source of the sound in space relative to the I/O device 104. For example, the snapping of a user's finger or a click from the input token 108 may be used to provide position/proximity data or for other input.

In some implementations, the input tokens 108 may incorporate sound generating devices such as clickers, whistles, and so forth. These sound generating devices may be used by the user 102 to generate a sound, which is detectable by the microphone 214(7). Thus, the sound, may act as a form of user input.

Other sensors 214(S) may be present in or associated with the I/O device 104 to provide sensor data 116. For example, the other sensors 214(S) may include one or more accelerometers, gyroscopes, magnetic field sensors, strain sensors for detecting mechanical strain, and so forth.

The one or more network interfaces 216 provide for the transfer of data between the I/O device 104 and another device directly such as in a peer-to-peer fashion, via the network 112, or both. The network interfaces 216 may include, but are not limited to, personal area networks ("PANs"), wired local area networks ("LANs") or other wired connections, wireless local area networks ("WLANs"), wireless wide area networks ("WWANs"), and so forth. The network interfaces 216 may utilize acoustic, radio frequency, optical, or other signals to exchange data between the I/O device 104 and another device such as the user device 110, the server 114, another I/O device 104, and the like.

The one or more memories 204 may store instructions or modules for execution by the processor 202 to perform certain actions or functions. The following modules are included by way of illustration, and not as a limitation. Furthermore, while the modules are depicted as stored in the memory 204, in some implementations, these modules may be stored at least in part in external memory, such as in the server 114 which is accessible to the I/O device 104 via the network 112. These modules may include an operating system module 218 configured to manage hardware resources such as the I/O interfaces 206 and provide various services to applications or modules executing on the processor 202.

The one or more memories 204 may also store a datastore 220. The datastore 220 may comprise one or more databases, files, linked lists, or other data structures. The datastore 220 may be configured to store the data 116 or a portion thereof. For example, the datastore 220 may store image data received from the user device 110 to present on the display 208. Other data 222 may also be stored such as, module state information, content such as audio or video, and so forth.

An I/O module 224 is stored in the memory 204. The I/O module 224 is configured to manage operation of, and transfer of data between, the various devices in the I/O device 104. The I/O module 224 may also provide, in some implementations, pre-processing of data received from the sensors 214.

A user interface module 226 is configured to provide a user interface to the user 102 during operation of the I/O device 104. The user interface module 226 may be configured to interpret user input and generate user outputs. User input may include key presses, touches on the touch sensor 214(1), movement of the input tokens 108, speech, and so forth. User outputs may include presentation on the display 208, sound from the speaker 210, haptic output from the haptic generator 212, and so forth. The user interface module 226 may be configured to work in conjunction with the interactive application as executing at least in part on the user device 110 or the server 114.

Other modules 228 may be present in the memory 204 as well. These modules 228 may include other functionality such as data encryption, speech synthesis, speech recognition, playback of content such as video or audio files, and so forth.

The I/O device 104 may be constructed, at least in part, of materials configured to allow folding or bending. For example, the display 208 and the touch sensor 214(1) may comprise flexible materials allowing the I/O device 104 to be rolled into a cylinder having a diameter of about one inch or more.

Figure 3:
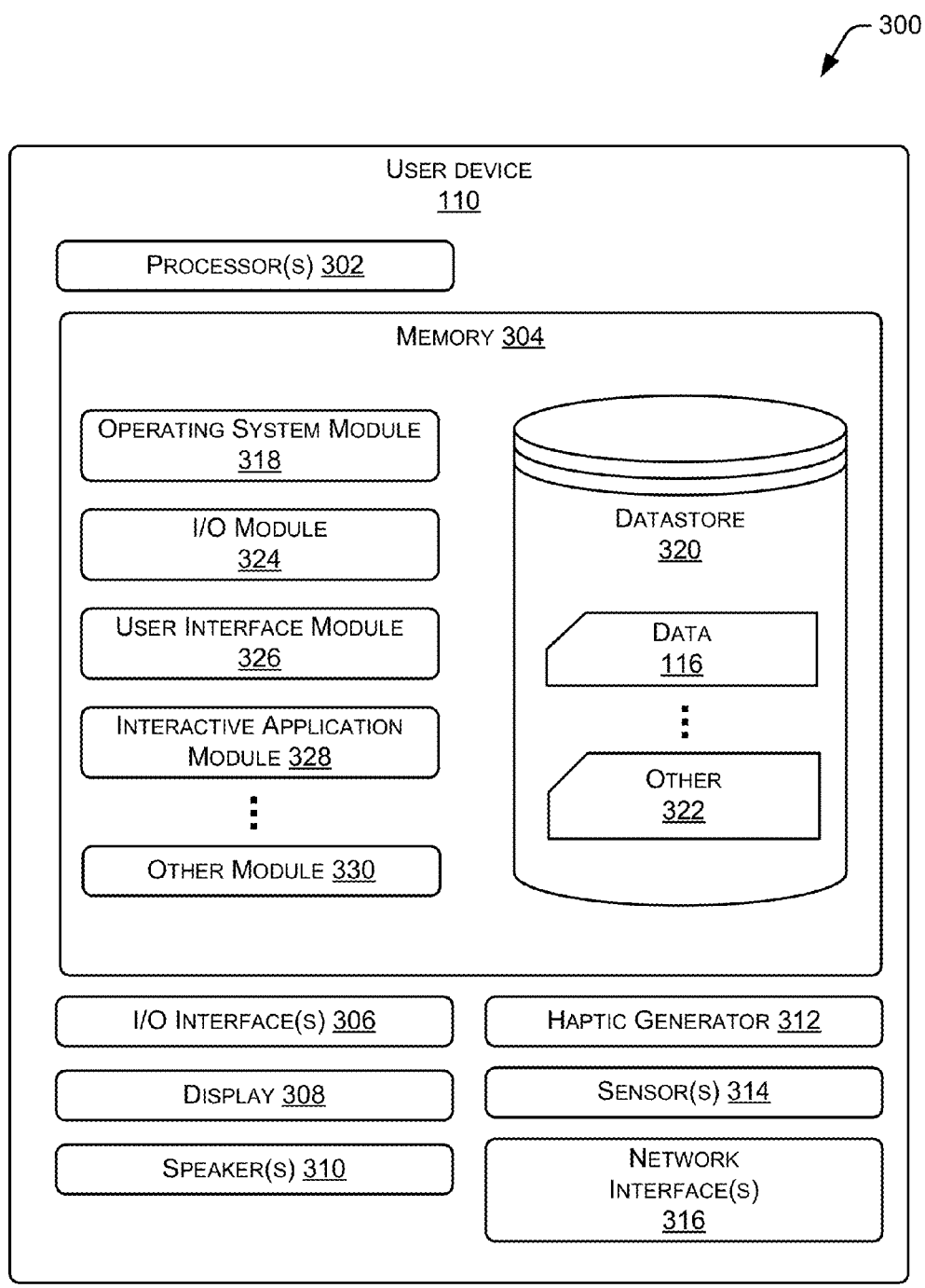
FIG. 3 illustrates a block diagram of the user device including sensors configured to provide sensor data in accordance with an embodiment of the disclosure.

FIG. 3 illustrates a block diagram 300 of the user device 110. Similar to the I/O device 104 described above, the user device 110 may comprise one or more processors 302, one or more memories 304, one or more input/output ("I/O") interfaces 306, one or more displays 308, one or more speakers 310, one or more haptic generators 312, one or more sensors 314, and one or more network interfaces 316. The user device 110 may include other devices not depicted.

The one or more memories 304 may store instructions or modules for execution by the processor 302 to perform certain actions or functions. The following modules are included by way of illustration, and not as a limitation. Furthermore, while the modules are depicted as stored in the memory 304, in some implementations, these modules may be stored at least in part in external memory, such as in the server 114 which is accessible to the user device 110 via the network 112. These modules may include an operating system module 318 configured to manage hardware resources such as the I/O interfaces 306 and provide various services to applications or modules executing on the processor 302.

The one or more memories 304 may also store a datastore 320. The datastore 320 may comprise one or more databases, files, linked lists, or other data structures. The datastore 320 may be configured to store the data 116 or a portion thereof such as image data to present on the display 308 or on the display 308 of the I/O device 104. Other data 322 may also be stored, such as operating system information, data from one or more sensors, content such as audio or video, and so forth.

An I/O module 324 is stored in the memory 304. The I/O module 324 is configured to manage transfer of data between the various devices of the I/O device 104 which is coupled to the user device 110 such as via the network interface 316. In some implementations the I/O module 324 may provide pre-processing of the data 116 to be sent to the I/O device 104.

A user interface module 326 is configured to provide a user interface which handles inputs from and outputs to the user 102 during operation of the user device 110, the I/O device 104, or both. User input may include key presses, touches on a touch sensor of the user device 110 or the touch sensor 214(1) of the I/O device 104, movement of the input tokens 108, speech input, and so forth. User outputs may include presentation on one or both of the displays 208 or 308, sounds from the speaker 210 of the I/O device 104 or a speaker 310 of the user device 110, and so forth. The user interface module 326 may be configured to work in conjunction with an interactive application module 328.

The interactive application module 328 provides the interactive application and functionality associated with the user which, when executed by the processor 302 provides one or more functions. The interactive application module 328 may be configured to save state data for later retrieval. For example, a board game in progress may be saved and continued at a later date. Interactive applications and functions associated with them are described below in more detail with regard to FIGS. 6-11.

Other modules 330 may be present in the memory 304 as well. These modules 330 may provide other functionality such as data encryption, speech synthesis, speech recognition, playback of content such as video or audio files, and so forth.

Figure 4:
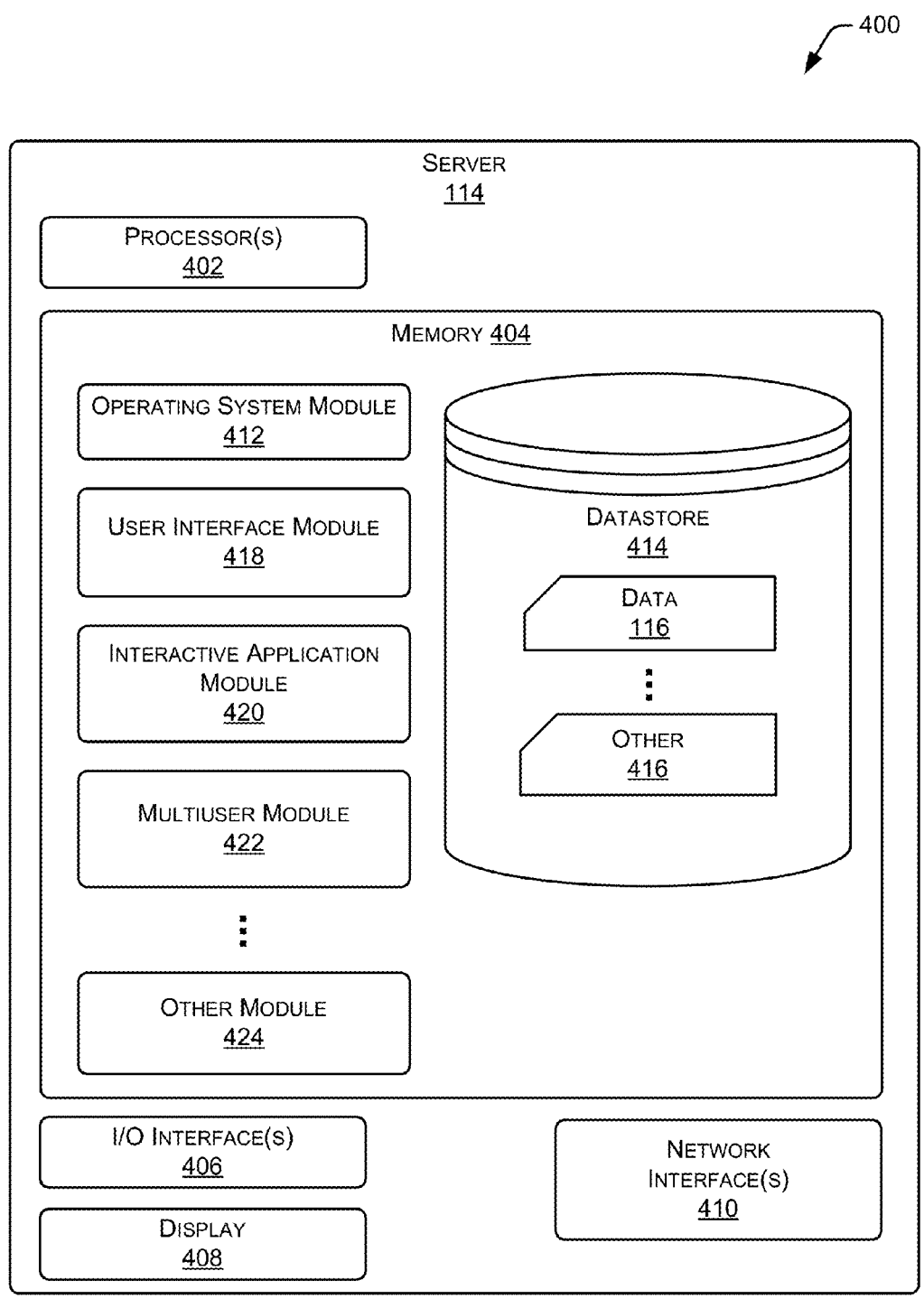
FIG. 4 illustrates a block diagram of a server configured to couple to the input/output device, the user device, or both in accordance with an embodiment of the disclosure.

FIG. 4 illustrates a block diagram 400 of a server 114. The server 114 may be configured to couple to one or more of the I/O devices 104, the user devices 110, or both. Similar to the devices described above, the server 114 may comprise one or more processors 402, one or more memories 404, one or more I/O interfaces 406, one or more displays 408, and one or more network interfaces 410. The server 114 may include other devices not depicted.

The one or more memories 404 may store instructions or modules for execution by the processor 402 to perform certain actions or functions. The following modules are included by way of illustration, and not as a limitation. Furthermore, while the modules are depicted as stored in the memory 404, in some implementations, these modules may be stored at least in part in external memory, such as in cloud storage which is accessible via the network 112. These modules may include an operating system module 412 configured to manage hardware resources such as the I/O interfaces 406 and provide various services to applications or modules executing on the processor 402.

The one or more memories 404 may also store a datastore 414. The datastore 414 may comprise one or more databases, files, linked lists, or other data structures. The datastore 414 may be configured to store the data 116 or a portion thereof such as interactive applications which utilize the I/O device 104. Other data 416 may also be stored, such as operating system information, data from one or more sensors, content such as audio or video, specifications for one or more of the I/O devices 104, and so forth.

A user interface module 418 is configured to provide a user interface which handles inputs from and outputs to the user 102. For example, the user interface comprises commands and data presented via a markup language, such as hypertext markup language ("HTML") web pages, delivered via the network 112. User input may include key presses, touches, speech input, and so forth as received from the user device 110, the I/O device 104, or another device. The user interface module 418 may be configured to work in conjunction with an interactive application module 420.

The interactive application module 420 provides an interactive application and functionality associated with the interaction application to the user which, when executed by the processor 402 provides one or more functions. The interactive application module 420 may be configured to provide functionality to the I/O device 104, the user device 110, or both. The interactive application module 420 may also work in conjunction with a multiuser module 422.

The multiuser module 422 is configured to exchange data 116 between two or more I/O devices 104. For example, the multiuser module 422 may be configured to allow users 102 at different locations and using different I/O devices 104 to play a common game. The multiuser module 422 may also be configured to process the data 116. For example, the I/O devices 104 may be configured to participate in a multiplayer roleplaying game in a virtual environment maintained by the multiuser module 422 and of which a portion is presented via the I/O devices 104 for the respective users 102. The interactive applications and functions associated with them are described below in more detail with regard to FIGS. 6-11.

Other modules 424 may be present in the memory 404 as well. These modules 424 may include other functionality such as billing for services, distribution of interactive application modules 420, and so forth.

Figure 5:
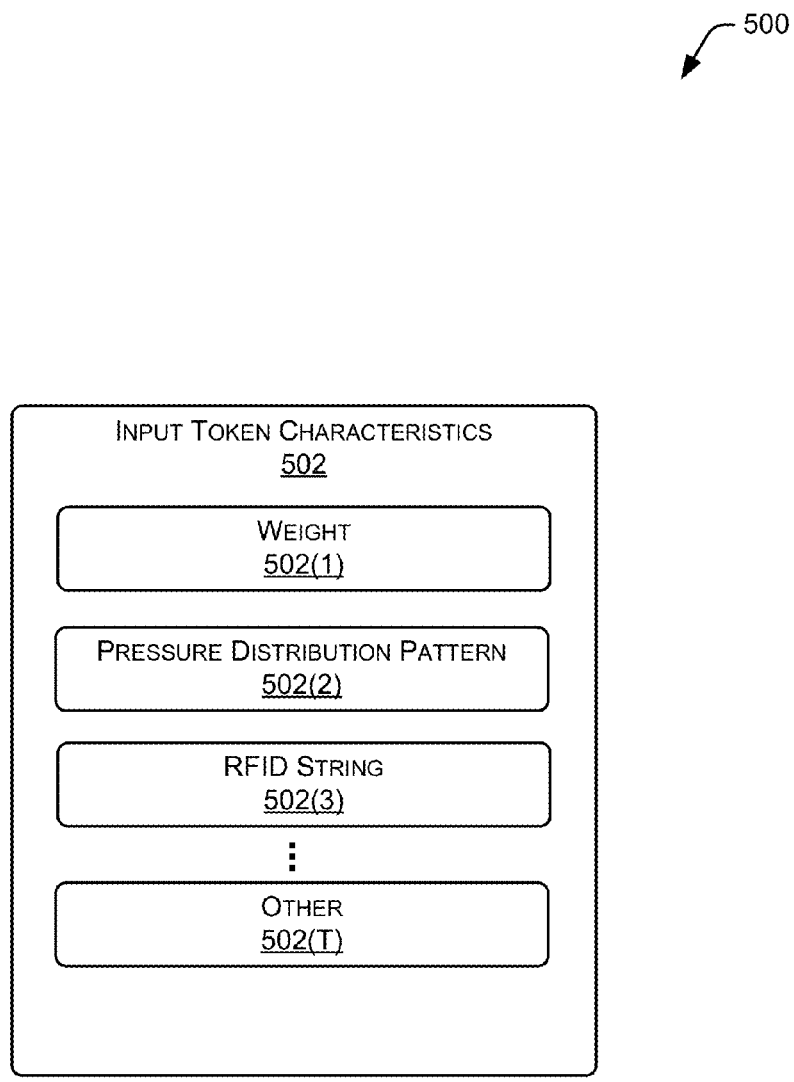
FIG. 5 illustrates a block diagram of characteristics for a token which may be used in conjunction with the input/output device in accordance with an embodiment of the disclosure.

FIG. 5 illustrates a block diagram 500 of characteristics for the input tokens 108 which may be used in conjunction with the I/O device 104. As described above, input tokens 108 may be used to add physicality to the interactive application. For example, while playing a board game, the input tokens 108 may be used to represent a position of one of the users 102 in the game.

The input tokens 108 may be configured such that they provide one or more input token characteristics 502 which are ascertainable by the I/O device 104, the user device 110, or both. These characteristics may be used to identify a particular input token 108 or determine a type or shape of the input token 108. In some implementations, the input tokens 108 may comprise components such as a communication interface to permit coupling to the I/O device 104 and one or more sensors such as a motion sensor. For example, the input token 108 may comprise a motion sensor, such as one or more accelerometers, gyroscopes, and so forth.

A weight 502(1) of the input tokens 108 may be configured such that tokens have distinct weights. When used in conjunction with a touch sensor 214(1) such as the IFSR array which can determine a magnitude of the force applied, based on the weight of the input token 108 on the touch sensor 214(1), information about the input token 108 may be determined. For example, the input token 108(1) may have a known weight of 20 grams, the input token 108(2) may have a known weight of 40 grams. The touch sensor 214(1) may distinguish the first input token 108(1) from the second input token 108(2) based on this difference in weight. The touch sensor 214(1) may be configured to provide absolute information about the magnitude of an applied force, such as providing a measurement in grams for each of the input tokens 108. In another implementation, the information about magnitude may be relative, such as the input token 108(2) weighs more than the input token 108(1). The input tokens 108 may be thus configured with different weights.

A pressure distribution pattern 502(2) of the input token 108 may be configured to provide data about the input token 108. For example, a particular arrangement of contact points may be provided on the input token 108 such that the first token has four contact points when resting on the touch sensor 214(1), another has five contact points, and so forth.

The input token 108 may incorporate an RFID tag such that when interrogated by the RFID sensor 214(3) an RFID string 502(3) is returned. In some implementations, the RFID string 502(3) may be modified to encode information about the input token 108. For example, input tokens 108 such as a set of dice may be configured such that the RFID string 502(3) is modified based on its resting position after a throw, allowing the I/O device 104 to read out the values generated by the dice for use in the interactive application.

Other input token characteristics 502(T) may also be used. For example, data may be optically encoded with a machine readable pattern onto at least a portion of the input token 108 and configured to be read by the camera 214(6). In other implementations, the shape, color, and so forth as detected by the camera 214(6) may be used to identify the input token 108.

Illustrative Scenarios

Figure 6:
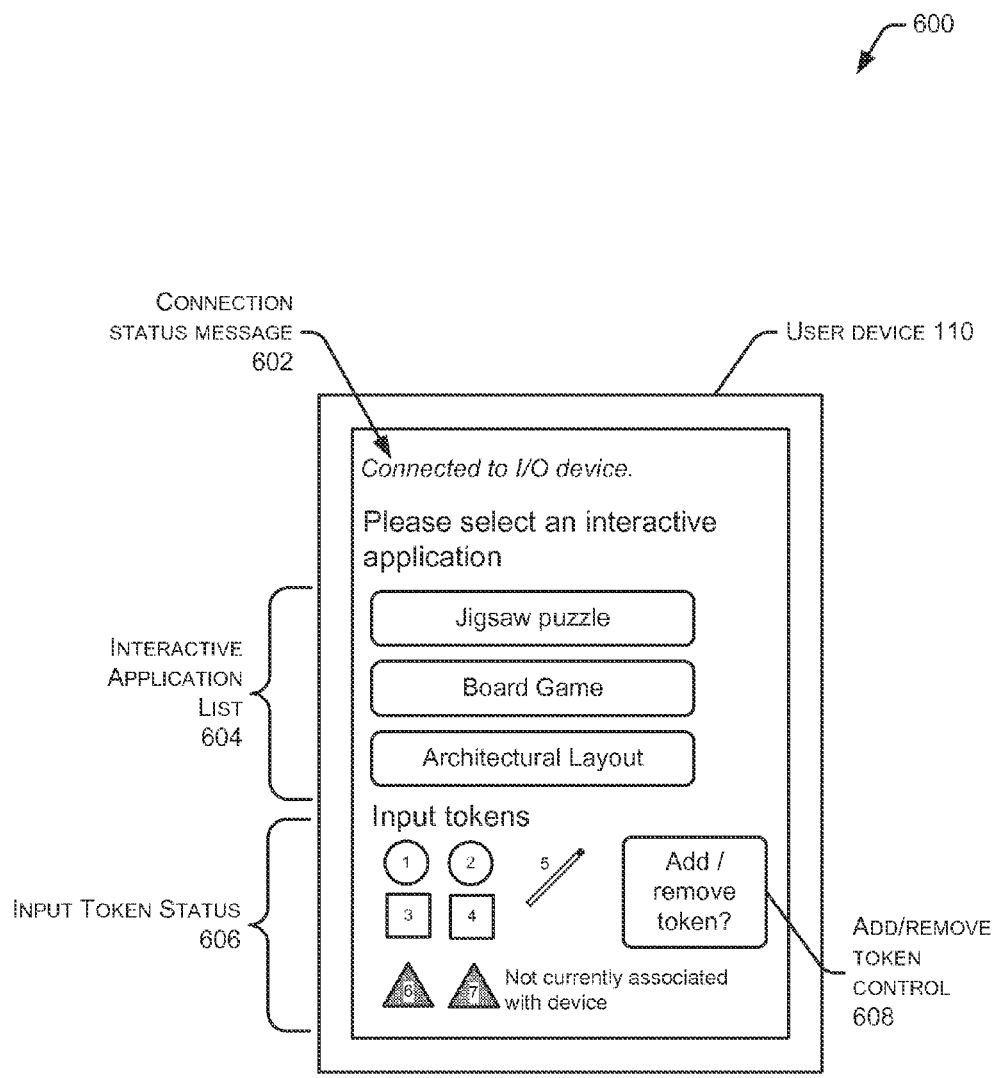
FIG. 6 illustrates a user interface of the user device as coupled to the input/output device in accordance with an embodiment of the disclosure.

FIG. 6 illustrates a user interface 600 of the user device 110 as coupled to the I/O device 104. In some implementations as described above, the user device 110 may execute the interactive application module 328. The interactive application module 328 may provide a user interface, such as the user interface 600 shown here, allowing the user 102 to select an interactive application, configure input tokens 108, and so forth.

The user device 110 is shown presenting on the display 308 the user interface 600 which comprises a connection status message 602. The connection status message 602 depicted here indicates that the I/O device 104 is connected to the user device 110 and available for use by the interactive application module 328. The user 102 may select one of the available interactive applications from an interactive application list 604. For example, as shown here, the user may select a jigsaw puzzle, a board game, or an architectural layout application.

Also depicted is input token status 606. The user 102 may be provided with this information to see what input tokens 108 the interactive application module 328 may have available for use. As shown here, the input tokens 108(1)-(5) are depicted as being present, while tokens 108(6)-(7) are indicated as being not currently associated with the device. The user 102 may activate controls such as an add/remove token control 608. This control 608, when activated, may be used to associate particular input tokens 108 with the I/O device 104 for use, or remove from use input tokens 108.

Figure 7:
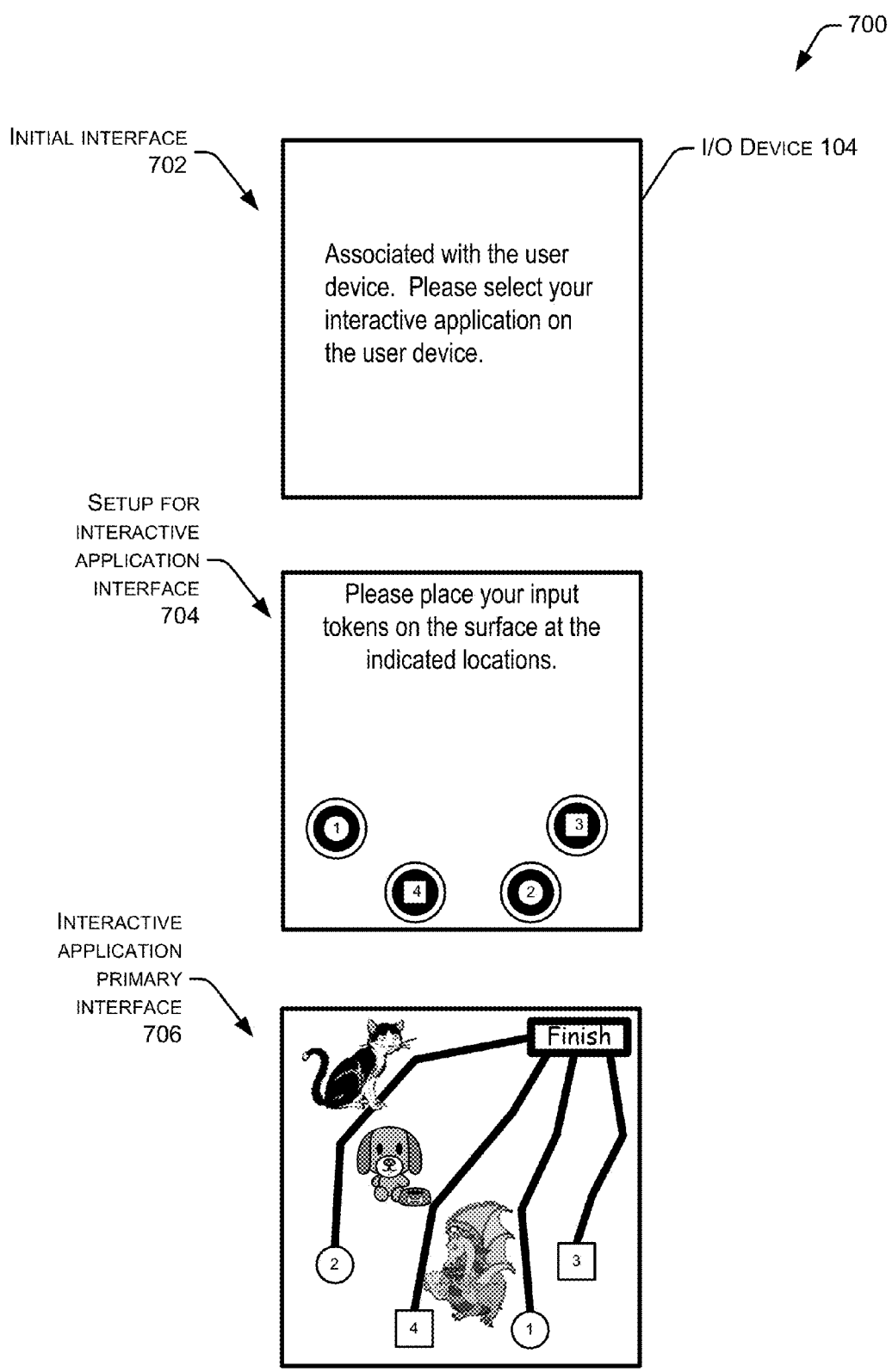
FIG. 7 illustrates a user interface of the input/output device as coupled to the user device as presenting an interactive application in accordance with an embodiment of the disclosure.

FIG. 7 illustrates a user interface 700 of the I/O device 104 as coupled to the user device 110. In this illustration, the display 208 of the I/O device 104 is presenting the user interface 700 as generated at least in part based on the interactive application module 328 executing at least in part on the user device 110.

An initial user interface 702 is presented on the I/O device 104. In this example, the user 102 is being notified that the I/O device 104 is connected to the user device 110 and asking for the user 102 to select the interactive application on the user device 110. For example, the user 102 may select a board game from the interface 600 described above.

A setup for interactive application interface 704 is depicted next. In this illustration, the user is being prompted to place four input tokens 108(1)-(4) upon the I/O device 104 in order to set up for the selected interactive application comprising a board game. Here, the display 208 is configured to provide a visual indicator for the position of each of the input tokens 108 which are used during play of the selected board game.

An interactive application primary interface 706 is shown following placement of the input tokens 108. In this illustration, the input tokens themselves have been omitted for clarity. Graphics and text associated with the board game selected by the user 102 is depicted. As described above, where the display 208 comprises electrophoretic paper, the presented interactive application primary interface 706 may remain presented on the display 208 even when power is discontinued.

Figure 8:
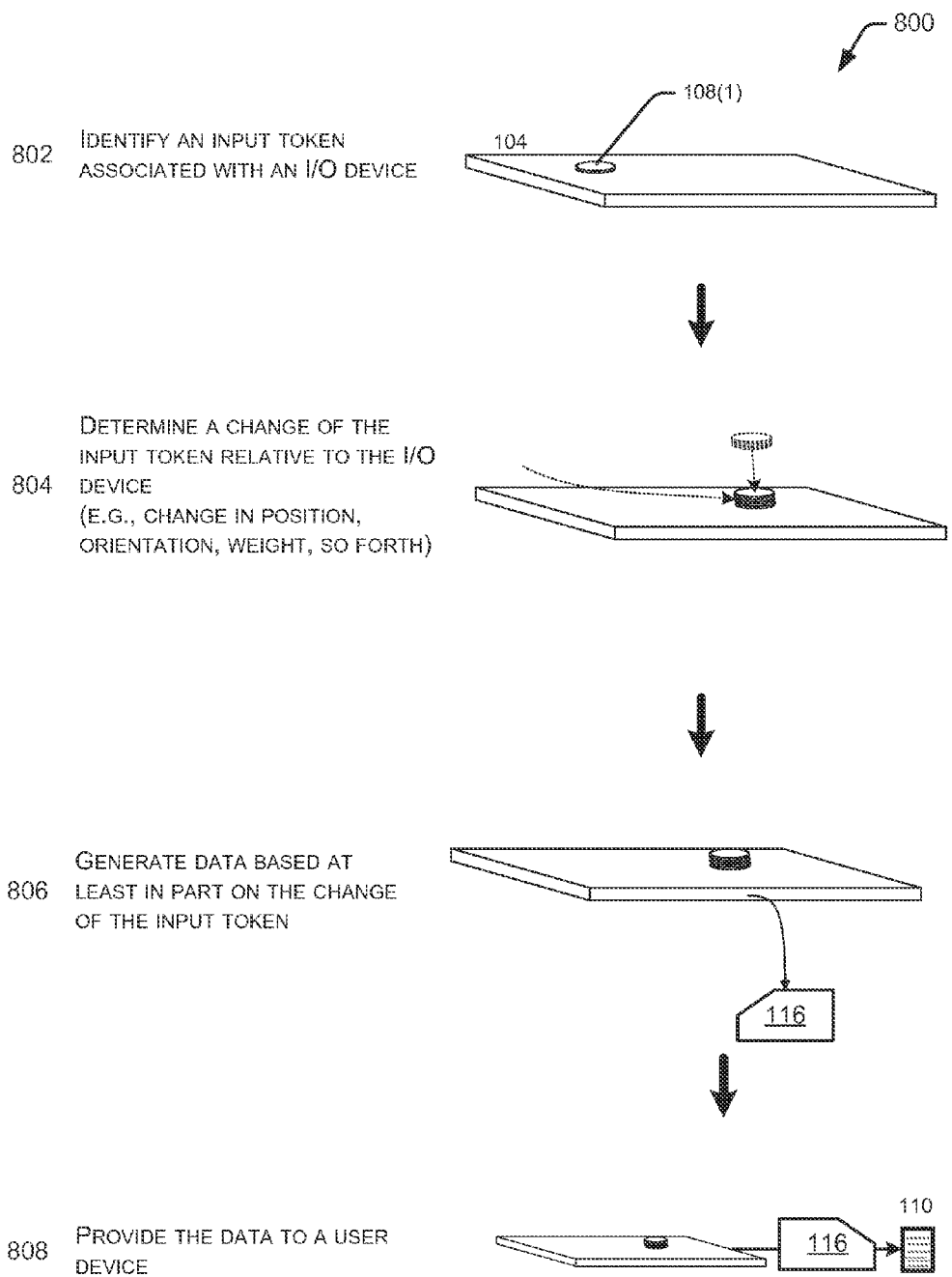
FIG. 8 illustrates a process of receiving input from an input token via the input/output device in accordance with an embodiment of the disclosure.

FIG. 8 illustrates a process 800 of receiving input from the input token 108 via the I/O device 104. As described above, the input tokens 108 may be used in conjunction with the I/O device 104 to provide physicality to the user interaction. The motion of these input tokens 108 on the I/O device 104 or near the I/O device 104 may be used to provide input for the interactive application.

At 802, the input token 108 associated with the I/O device 104 is identified. For example, based at least in part on the token characteristics of the weight 502(1), the pressure distribution pattern 502(2), and the RFID string 502(3), the round input token 108(1) may be identified. The position of the input token 108 relative to or upon the I/O device 104 may also be determined. For example, data from the touch sensor 214(1) may be used to determine the position of the input token 108(1).

At 804, a change of the input token relative to the I/O device 104 is determined. The change may comprise one or more of a change in position, orientation, weight, and so forth. As illustrated here, additional weights may be stacked atop the identified input token 108(1).

At 806, data 116 is generated based at least in part on the change of the input token 108. For example, the increase in weight and motion of the input token 108 may be determined by the touch sensor 214(1)

At 808, the data 116 is provided by the I/O device 104 to the user device 110. This data 116 may be provided by the I/O interfaces 206, the network interfaces 216, and so forth of the I/O device 104. The interactive application module 328 may then use this data 116 to update the interactive application. For example, the data 116 indicating the increase in weight of the input token 108(1) may be used to increase the points accrued to the user 102 associated with the input token 108(1).

Figure 9:
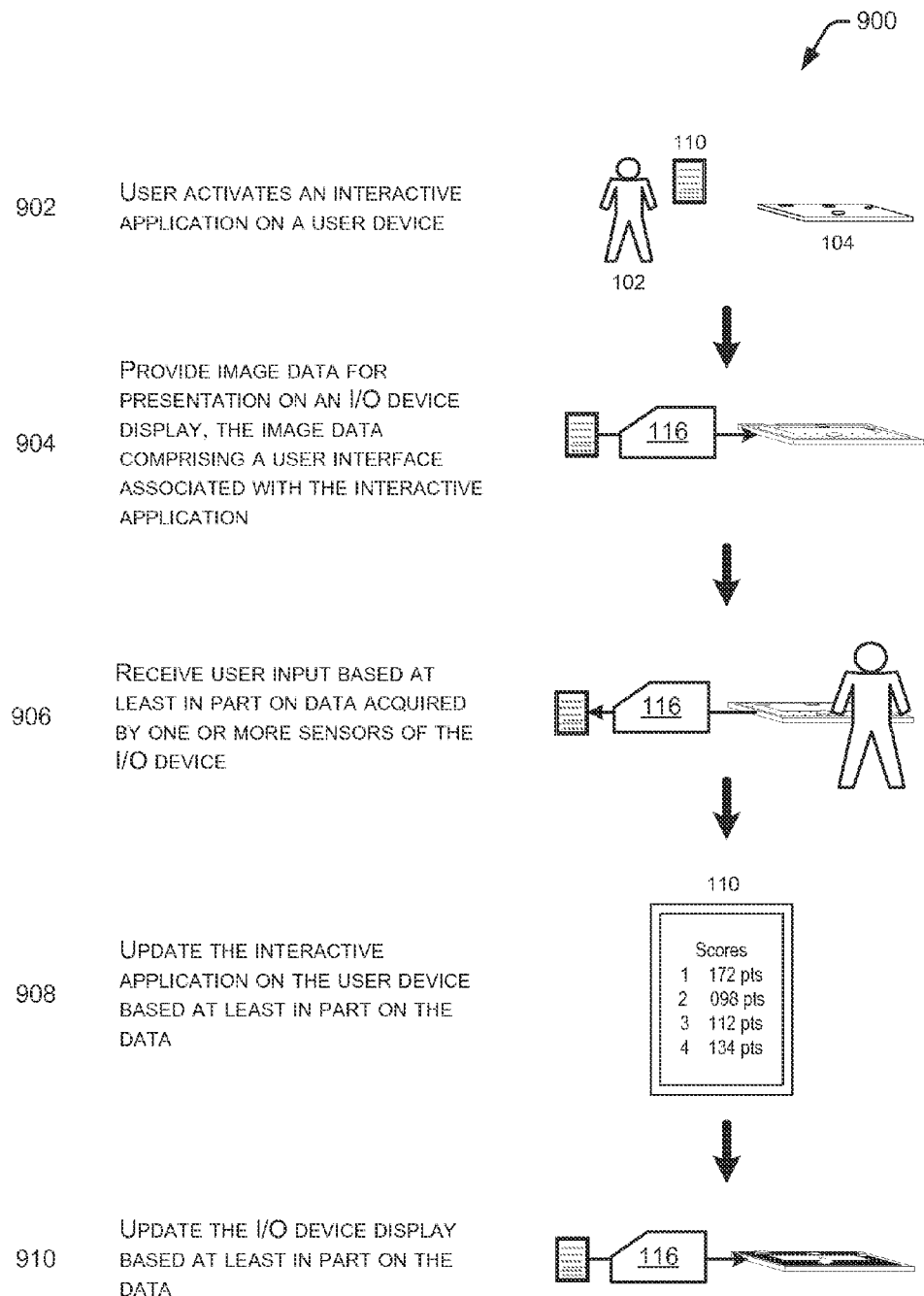
FIG. 9 illustrates a process of presenting an interactive application with the user device and the input/output device in accordance with an embodiment of the disclosure.

FIG. 9 illustrates a process 900 of presenting an interactive application with the user device 110 and the I/O device 104. In some implementations, the I/O device 104 may have constraints on processor and memory capabilities compared to other devices such as the user device 110, the server 114, and so forth. These constraints may result from design considerations in which the production cost of the I/O device 104 is to be minimized. As a result of these constraints, the I/O device 104 may operate in conjunction with the user device 110 to provide the interactive application.

At 902, the user 102 or an executing process activates an interactive application on the user device 110 which is configured to communicate with the I/O device 104. For example, as shown above with regards to FIG. 6, the user 102 may have selected a board game as provided by the interactive application module 328. The I/O device 104 may be external from the user device 110 such that they are communicatively coupled but are physically distinct. In some implementations, the interactive application may be executed at least in part on a device accessible via the network 112, such as the server 114.

At 904, the user device 110 provides image data for presentation on the display 208 of the I/O device 104. The image data may comprise a user interface associated with the interactive application, such as the board game interface 700 as described above.

At 906, the user device 110 receives data 116 from the I/O device 104. The data 116 comprises user input acquired by the one or more sensors 214 of the I/O device 104. For example, the data 116 may comprise results from a roll of input tokens 108 acting as dice, or the motion of the input token 108 acting as a playing piece on the I/O device 104.

At 908, the interactive application module 328 of the user device 110 updates the interactive application based at least in part on the data 116. For example, as shown here, scores for the players of the board game may be calculated by the user device 110 and presented on the display 308 such that a running tally of the scores is maintained. In another implementation, the interactive application module 328 may be executing on the server 114 or another device accessible via the network 112.

At 910 the display 208 of the I/O device 104 is updated based at least in part on the data 116. For example, the interactive application module 328 may have determined that based on the move of the user's input token 108, the arrangement of elements on the interactive application primary interface 706 is changed and the display 208 is updated accordingly.

Figure 10:
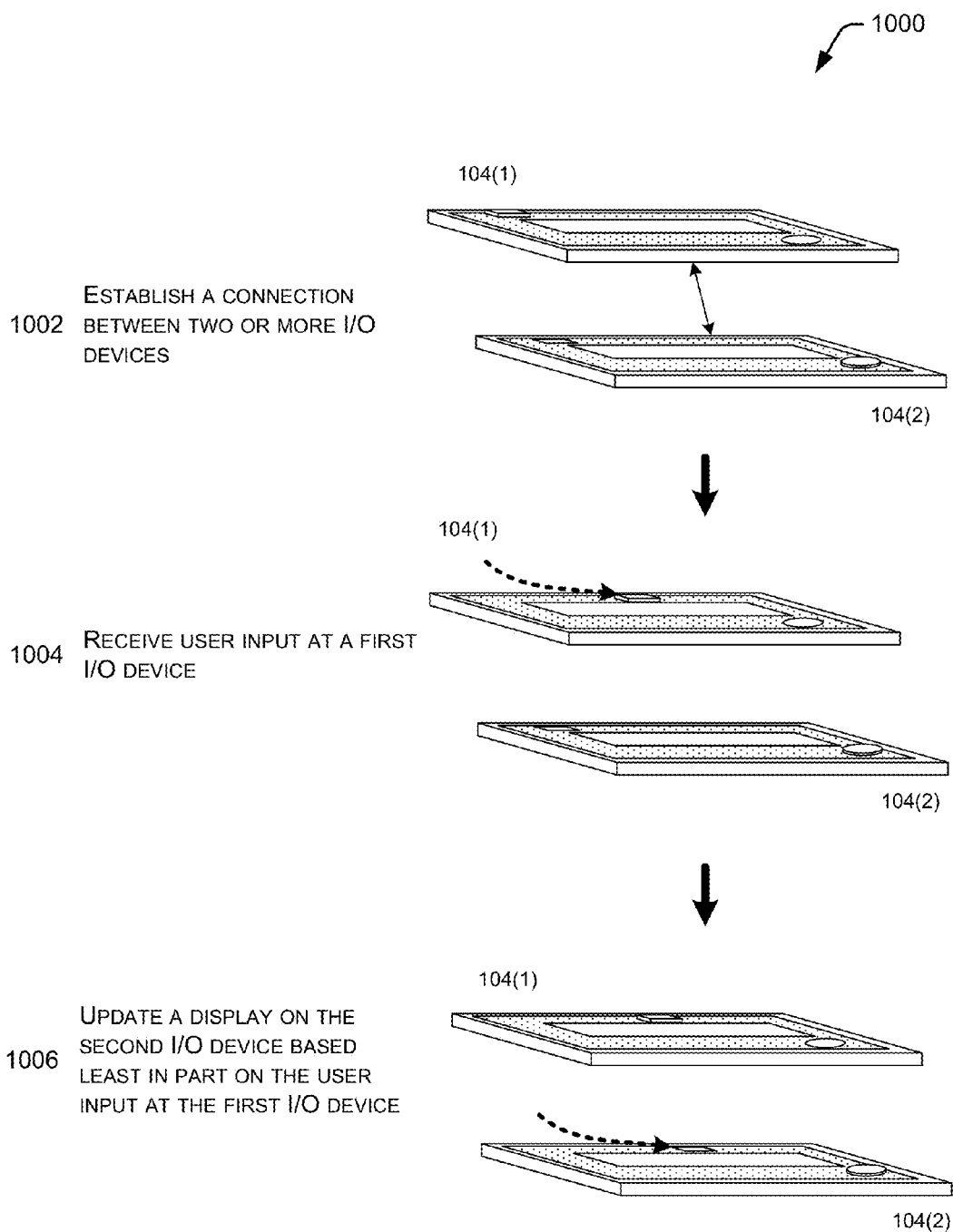
FIG. 10 illustrates a process of providing an interactive application across two or more input/output devices connected together in accordance with an embodiment of the disclosure.

FIG. 10 illustrates a process 1000 of providing an interactive application across two or more I/O devices 104 connected together. The I/O devices 104 may be connected to one another via a cable or PAN connection, via one or more user devices 110, the network 112, or a combination thereof. For example, the I/O devices 104(1) and 104(2) may connect to one another using their network interfaces 216 via the network 112 with the multiuser module 422 handling interchange of the data 116 between the I/O devices 104(1)-(2).

This configuration may be used where users 102 may wish to use multiple I/O devices 104 either at the same physical location or at a different physical location. For example, two architectural designers may be in the same room, or in different offices, and use the I/O devices 104 and the input tokens 108 to present floor plans and aid in planning the placement of furniture.

At 1002, a connection is established between two or more of the I/O devices 104. For example, the I/O devices 104 may use a built in network interface 216 to connect to the server 114 and setup a communication session via the multiuser module 422.

At 1004, user input is received at a first I/O device 104(1). For example, the user 102(1) may have moved the input token 108(1) across the surface, indicating a change in placement of a piece of furniture on the floorplan.

At 1006, the display 208(2) on a second I/O device 104(2) is updated, based at least in part on the user input by the user 102(1) on the first I/O device 104(1). For example, the display 208(2) may display the presented data 106 which is indicative of the move of the piece of furniture on the floorplan.

In a similar fashion, user input at the second I/O device 104(2) may result in changes to the presented data 106 on the first I/O device 104(1). In this way, two or more I/O devices 104 may be configured to interact with one another.

Figure 11:
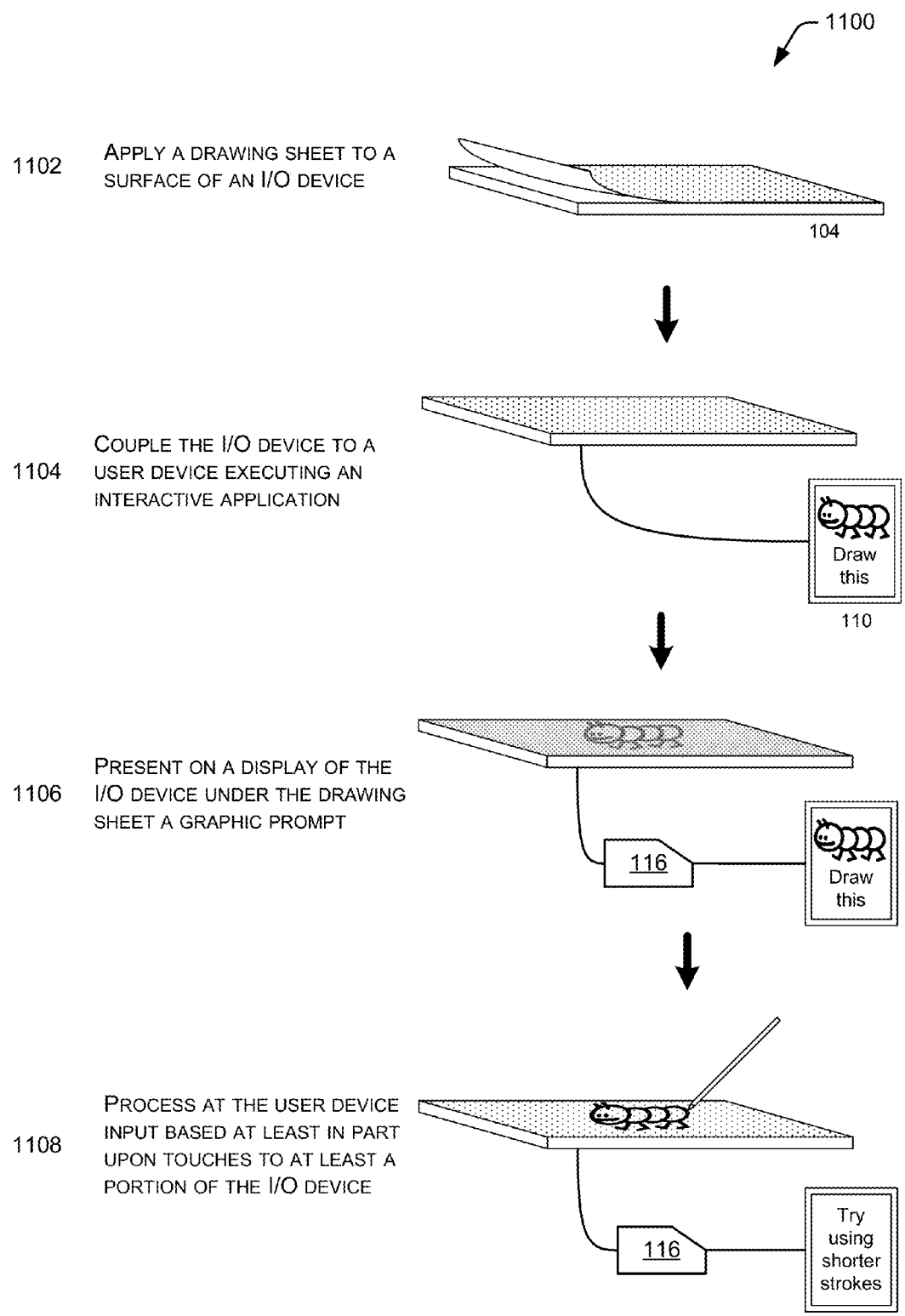
FIG. 11 illustrates a process of applying a drawing sheet to the input/output device in accordance with an embodiment of the disclosure.

FIG. 11 illustrates a process 1100 of applying a drawing sheet to the I/O device 104. Users 102 may choose to work with traditional manual input means such as pen, ink, paint, and such. As described here, the I/O device 104 may be used to facilitate training for these manual input means.

At 1102, a drawing sheet is applied to a surface of the I/O device 104. The drawing sheet may comprise a paper, plastic, or other material suitable for use. In some implementations, the drawing sheet may be opaque, translucent, or transparent.

At 1104, the I/O device 104 is coupled to the user device 110 executing the interactive application, such as an art tutorial. As shown here, the user device 110 is presenting a cartoon for the user 102 to attempt to draw on the drawing sheet.

At 1106, the I/O device 104 presents on the display 208, under the drawing sheet, a graphic prompt such as an image of the cartoon. Where the drawing sheet is transparent or translucent, the user 102 may see the image and begin to practice drawing the cartoon.

At 1108, the I/O device 104 provides to the user device 110 the data 116 comprising the user device input. This data 116 may indicate where and how hard the user 102 is pressing with a pencil while drawing on the drawing sheet. This data 116 may be provided by the touch sensor 214(1) of the I/O device 104. The user device 110 may process the data 116 and provide feedback or instructions to the user. For example, the user device 110 may provide output suggesting the user 102 try using shorter strokes while drawing.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An input/output device, comprising:
    a reflective display configured to present at least a portion of image data as an image and retain the image thereon without application of electrical power;
    a touch sensor array disposed coincident with the reflective display, the touch sensor array configured to generate touch data comprising a position and a magnitude of an applied force on the array corresponding to an input token, wherein the touch data comprises first input token touch data generated based at least in part on an interaction of the input token with the touch sensor array, the touch sensor array being further configured to: i) identify the input token and distinguish the input token from one or more other input tokens based at least in part on a correspondence between at least a portion of the input token touch data and stored data indicative of one or more attributes of the input token and ii) generate second input token touch data indicative of a change to the interaction between the input toke and the touch sensor array; and
    an input/output interface coupled to the display and the touch sensor array, the input/output interface configured to couple to an external device and transmit the first input token touch data to an interactive application executing on the external device to cause a first attribute to be assigned to a user account associated with the input token based at least in part on the first input token touch data and transmit the second input token touch data to the interactive application to cause the first attribute to be replaced with a second attribute based at least in part on the second input token touch data.

2. The device of claim 1, the input/output interface comprising a wireless networking interface configurable to access a network and the external device comprising a server coupled to the network.

3. The device of claim 1, further comprising a haptic generator configured to generate haptic output perceptible to a user on the display at least partly in response to receiving haptic output data.

4. The device of claim 1, the touch sensor array comprising an interpolating force sensing resistor device.

5. The device of claim 1, wherein the display and the touch sensor array are flexible.

6. The input/output device of claim 1, wherein the stored data indicative of one or more attributes of the input token comprises data indicative of a weight of the input token, and wherein the touch sensor array is configured to identify the input token based at least in part on a correspondence between the magnitude of the applied force and the weight of the input token.

7. The input/output device of claim 1, wherein the stored data indicative of one or more attributes of the input token comprises data indicative of a number of contact points of the input token, wherein the at least a portion of the input token touch data comprises data indicative of a number of contact points detected from the interaction of the input token with the touch sensor array, and wherein the touch sensor array is configured to identify the input token based at least in part on a correspondence between the number of contact points of the input token and the number of detected contact points.

8. The input/output device of claim 1, wherein the at least a portion of the input token touch data comprises machine readable data encoded on the input token, and wherein the touch sensor array is configured to identify the input token based at least in part on a correspondence between the machine readable data and the stored data indicative of one or more attributes of the input token.

9. The input/output device of claim 1, wherein the second input token touch data indicates an increase in the magnitude of the applied force, wherein the first attribute and the second attribute represent a first point value and a second point value, respectively, assigned to the user account, and wherein the second point value is greater than the first point value based at least in part on the increase in the magnitude of the applied force.

10. A device, comprising:
a processor;
a display coupled to the processor and configured to present an image;
a touch sensor coupled to the processor and coupled with at least a portion of the display, the touch sensor configured to generate touch data indicating a position on the touch sensor of an applied touch corresponding to an input token, wherein the touch data comprises first input token touch data generated based at least in part on an interaction of the input token with the touch sensor, the touch sensor being further configured to: i) identify the input token and distinguish the input token from one or more other input tokens based at least in part on a correspondence between at least a portion of the first input token touch data and stored data indicative of one or more attributes of the input token and ii) generate second input token touch data indicative of a change to the interaction between the input token and the touch sensor;
an interface coupled to the processor and the touch sensor, the interface configured to couple to an external device and transmit the first input token touch data to an interactive application executing on the external device to cause a first attribute to be assigned to a user account associated with the input token based at least in part on the first input token touch data and transmit the second input token touch data to the interactive application to cause the first attribute to be replaced with a second attribute based at least in part on the second input token touch data; and
one or more supplemental sensors coupled to the processor and configured to accept input.

11. The device of claim 10, the interface configured to couple to the external device via one or more of a wireless personal area network, a wireless local area network, a wireless wide area network, or a cable.

12. The device of claim 10, the touch sensor comprising an interpolating force sensing resistor array, and wherein the touch data comprises a magnitude of an applied force.

13. The device of claim 10, the device further comprising one or more of a speaker, a haptic output device, or a light.

14. The device of claim 10, the one or more supplemental sensors comprising one or more of a proximity sensor, an ultrasonic rangefinder, a light sensor, a radio frequency identification tag reader, a location device, a microphone, or a camera.

15. The device of claim 10, the one or more supplemental sensors comprising a motion sensor disposed in an input token moveable in relation to the display.

16. The device of claim 10, further comprising a memory configured to store the interactive application the interactive application, the interactive application comprising one or more instructions which, when executed by the processor are configured to generate at least a portion of the image, accept the first input token touch data and the second input token touch data, and accept input from at least a portion of the one or more supplemental sensors.

17. One or more non-transitory computer-readable media storing computer-executable instructions that, when executed by at least one processor, configure the at least one processor to perform operations comprising:
activating an interactive application configured to communicate with an external input/output device;
providing image data for presentation to a display of the input/output device;
receiving sensed data from the input/output device based at least in part on input received by one or more sensors of the input/output device, wherein the sensed data comprises first input token touch data generated based at least in part on an interaction of an input token with at least one of the one or more sensors, wherein the input token is identified and distinguished from one or more other input tokens based at least in part on a correspondence between at least a portion of the first input token touch data and stored data indicative of one or more attributes of the input token, and wherein the sensed data further corn rises second input token touch data generated based at least in part on a change to the interaction between the input token and the at least one of the one or more sensors;
assigning, using the interactive application, a first attribute to a user account associated with the input token based at least in part on the first input token touch data; and
replacing, using the interactive application, the first attribute with a second attribute based at least in part on second input token touch data.

18. The one or more computer-readable media of claim 17, wherein the display of the input/output device comprises an electrophoretic display with an update rate at or below ten times per second and the one or more sensors of the input/output device comprise an interpolating force sensing resistor array configured to determine a position of an incident force on the array and a magnitude of the incident force.

19. The one or more computer-readable media of claim 17, wherein the interactive application comprises a board game configured such that the display of the input/output device when presenting the image data provides a playing surface.

20. The one or more computer-readable media of claim 17, the operations further comprising exchanging the sensed data with a second interactive application executing on another device.

* * * * *